July 3, 1962  H. L. CARPENTER, SR  3,042,288
FIBER DRUM AND ITS METHOD OF FORMATION
Filed Oct. 1, 1958  5 Sheets-Sheet 1
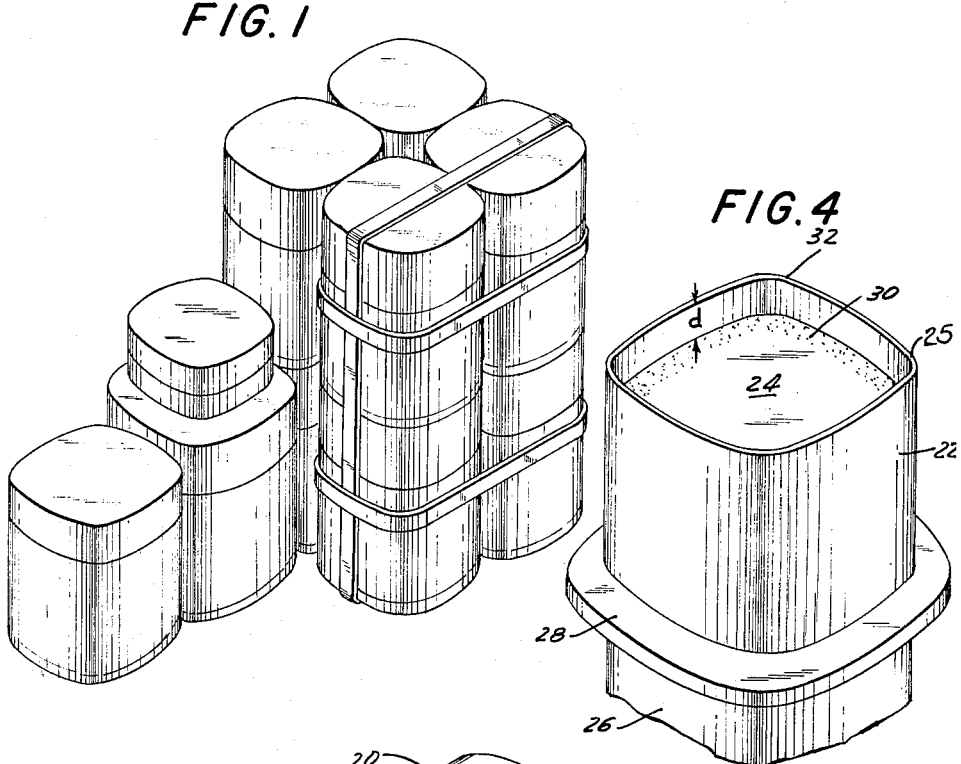
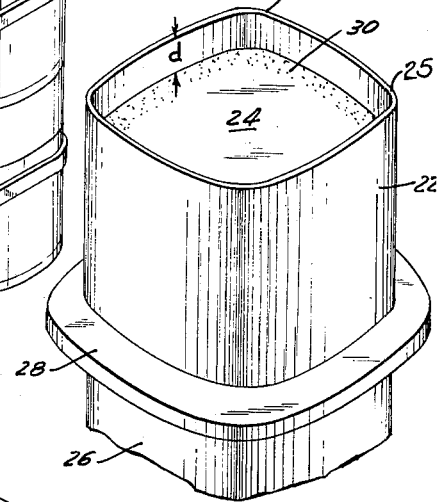
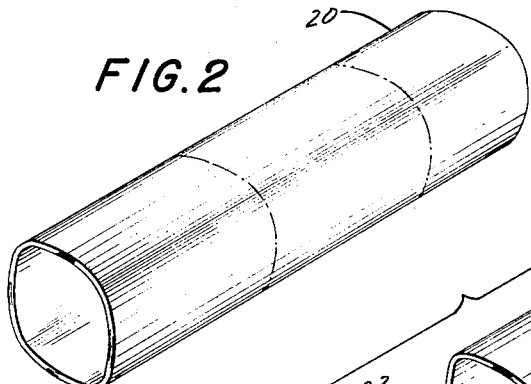
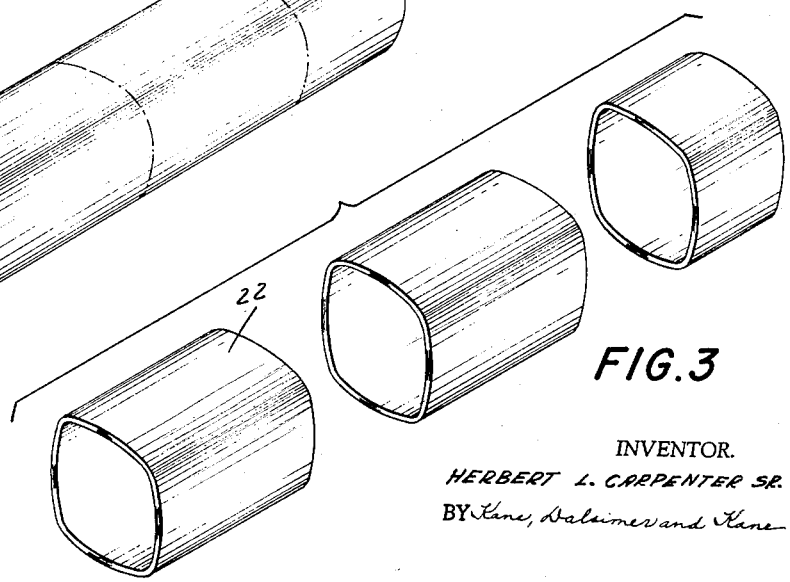
INVENTOR.
HERBERT L. CARPENTER SR.
BY Kane, Dalsimer and Kane
ATTORNEYS July 3, 1962   H. L. CARPENTER, SR   3,042,288
FIBER DRUM AND ITS METHOD OF FORMATION
Filed Oct. 1, 1958   5 Sheets-Sheet 2
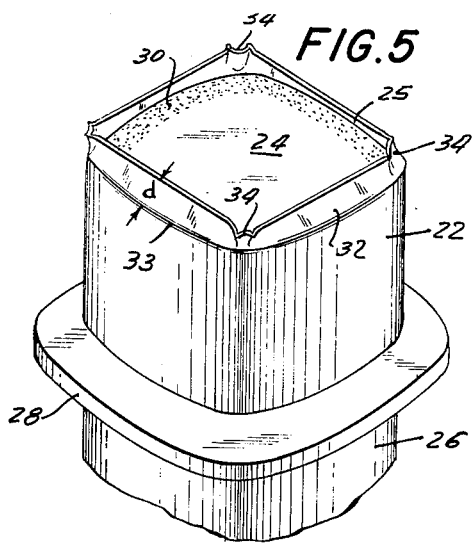
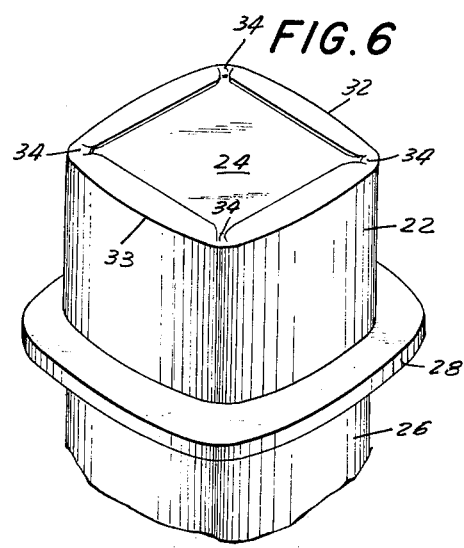
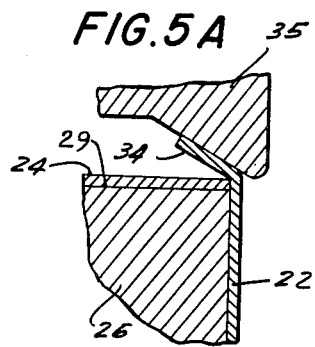
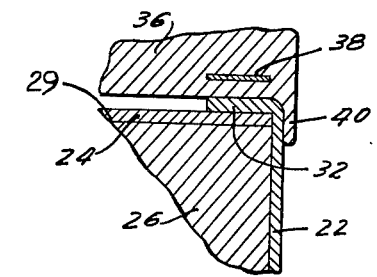
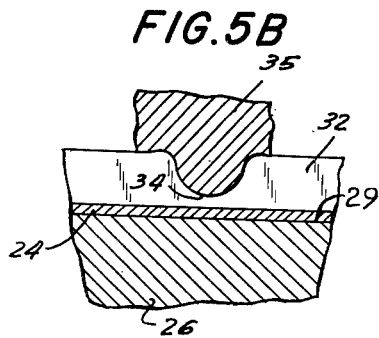
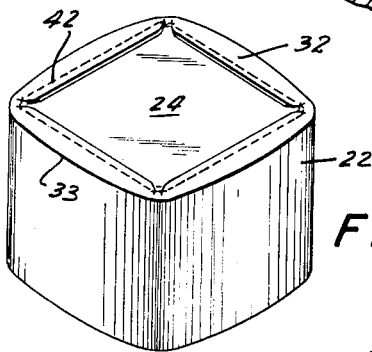
INVENTOR.
HERBERT L. CARPENTER SR.
BY Kane, Dalimer and Kane
ATTORNEYS July 3, 1962 H. L. CARPENTER, SR 3,042,288
FIBER DRUM AND ITS METHOD OF FORMATION
Filed Oct. 1, 1958 5 Sheets-Sheet 3
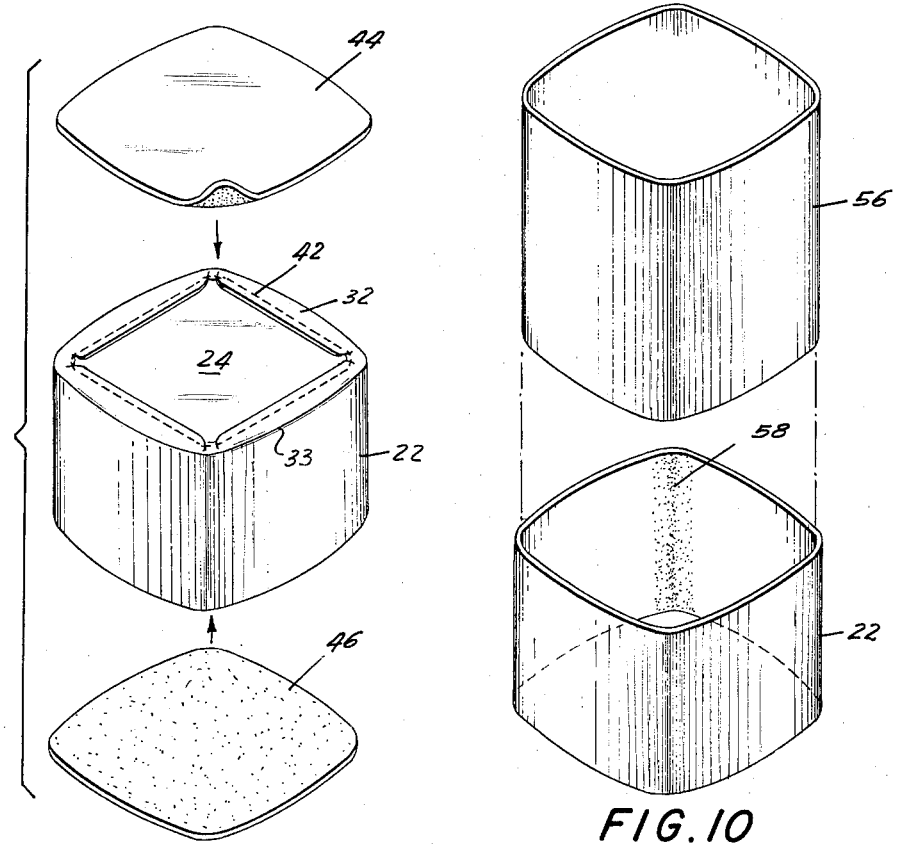
FIG. 8
FIG. 10
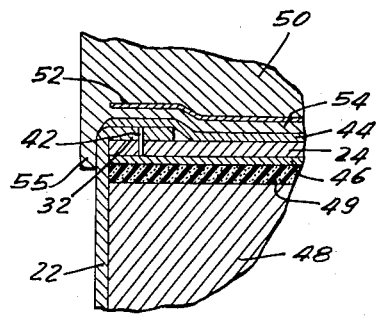
FIG. 9
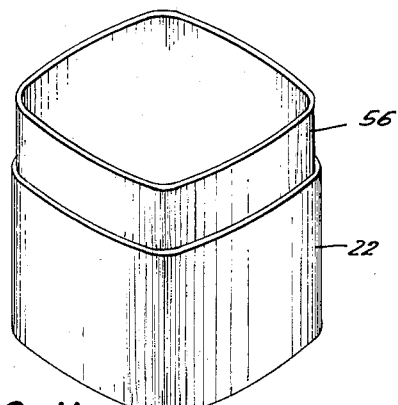
FIG. 11
INVENTOR.
HERBERT L. CARPENTER SR.
BY Kane, Dalsimer and Kane
ATTORNEYS July 3, 1962 H. L. CARPENTER, SR 3,042,288
FIBER DRUM AND ITS METHOD OF FORMATION
Filed Oct. 1, 1958 5 Sheets-Sheet 4
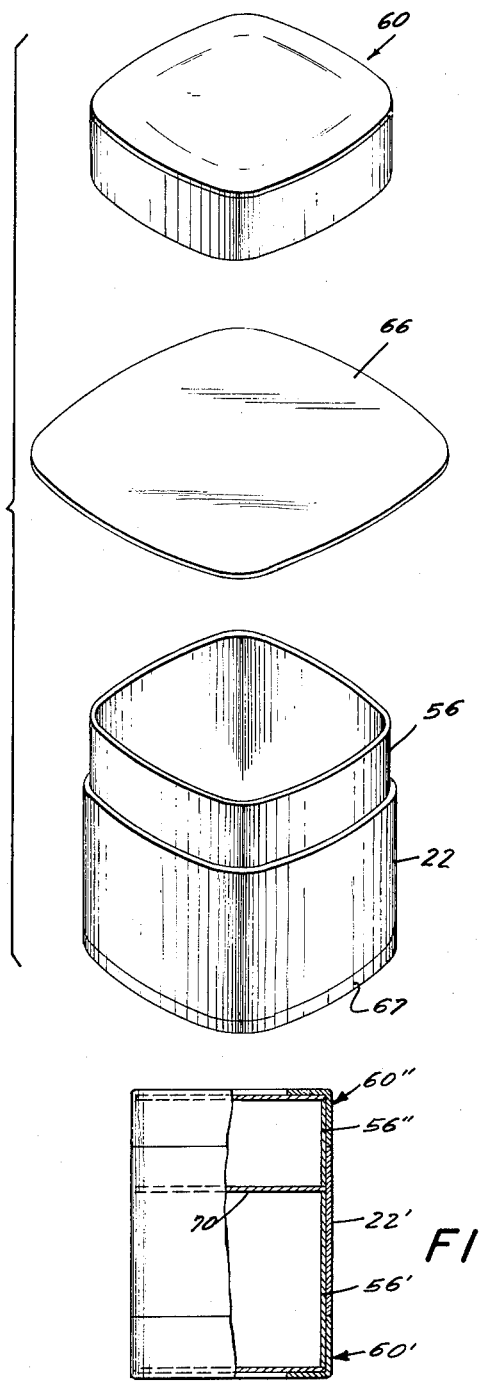
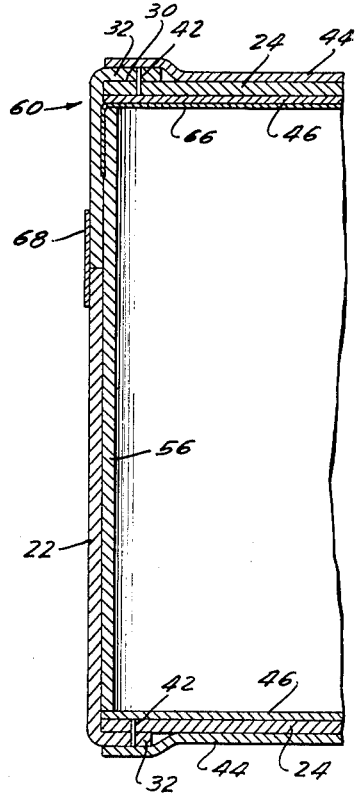
INVENTOR.
HERBERT L. CARPENTER SR.
BY Kane, Dalsimer and Kane
ATTORNEYS

United States Patent Office 3,042,288
Patented July 3, 1962

3,042,288
FIBER DRUM AND ITS METHOD OF FORMATION
Herbert L. Carpenter, Sr., Amityville, N.Y., assignor to The Greif Bros. Cooperage Corporation, Delaware, Ohio, a corporation of Delaware
Filed Oct. 1, 1958, Ser. No. 764,610
2 Claims. (Cl. 229—67)

This invention relates to an improved fiber drum as well as its method of fabrication, and is a continuation-in-part of my application Serial Number 589,025, filed June 4, 1956, now abandoned.

Fiber drums and similar containers are usually made from convolutely wound or spirally wound laminated layers of fibrous material, such as kraft paper. They are generally used for shipping and storing a variety of materials and articles, as for example, raw materials, bulk chemicals, munitions, sensitive instruments including electronic tubes and the like.

These fiber drums and containers are frequently subjected to rough handling especially during their period of use. In this connection, they may be dropped from the tailboard of a truck or from a shipping platform, and may even have other containers and articles dropped upon them in shipping. In addition, loaded containers are frequently stacked one upon another, thereby placing an additional stress upon their walls, particularly those of the lowermost containers. Under such circumstances, fiber drums and containers must be of strong, sturdy construction and capable of withstanding the abuse to which they are subjected in shipment and storage.

Many of the cylindrical fiber drums and containers, having transversely circular cross-sections, as heretofore available, have been sufficiently strong to withstand this use and abuse. However, these cylindrical drums and containers have the inherent disadvantage that they are uneconomic in their space requirements. Thus, in their shipment and storage there is necessarily a considerable amount of waste space between the cylindrical sides of adjacent drums, which is multiplied as these drums are stacked one upon another. In addition, an appreciable amount of waste material results from the manufacture of the bottom closures and head for such fiber drums and containers.

Non-cylindrical containers having a plurality of sides, as for instance rectangular containers, are efficient in their utilization of shipping and storage space, since they may be placed in contiguous relationship with minimum space wasted between their sides. However, other difficulties and disadvantages are encountered with containers having this substantially rectangular configuration. Thus, fiber containers having straight rectangular sides do not possess sufficient strength to withstand the use and abuse normally encountered during the contemplated shipment and storage. In this connection, there is a tendency for the sides of these rectangular fiber containers to become transversely concave and to collapse inwardly when subjected to stresses and strains imparted and experienced under such conditions. Furthermore, because of the developed concave contour of the sides, it is extremely difficult to maintain a tight seal between the head or closure and the body of the container, with the result that there is a danger of content contamination and, additionally, inevitable sifting and loss of certain types of container content. Difficulty has also been encountered in winding and fabricating rectangular fiber shells, in that, the fiber is frequently mutilated or damaged, thereby weakening the finished shell wall.

Accordingly, it is an object of my present invention to overcome the difficulties heretofore encountered in the fiber drum and container field and, accordingly, provide an improved fiber drum which is rugged and strong so that it can withstand the stresses and strains encountered in shipment and in storage; which is efficient in the utilization of space and minimizes waste space between the sides of adjacent drums in storage and shipment; and which, at the same time, reduces the waste of material in the manufacture of closures and heads for such drums.

Other objects of my invention include the provision of a fiber drum having a plurality of sides and its method of formation wherein such drum may be rendered available in a wide range of sizes; wherein this drum provides up to 20 to 25% greater cubic capacity per unit of space required for shipping or storage; wherein the drum is readily opened and closed and easy to seal as well as reseal; wherein the drum has a full open top facilitating the filling and dispensing of its contents; wherein the drum is adapted to include many protective linings, barriers and coatings suitable for the shipment and storage of hygroscopic, deliquescent and sensitive products; wherein the drum may have interlinings and barriers as well as a lined interior to provide protection and moisture vapor resistance; wherein such drums are well suited for supply in multiple strapped units thereby reducing shipping and handling charges; wherein the drum provides for easy nesting to conserve storage and shipping space; and wherein the drum is so constructed and arranged that it will inherently minimize any detrimental affects of container "breathing" due to changes in the ambient.

Another object is a provision of a fiber drum having a plurality of sides, preferably four, which is sturdy and strong so that the sides will not collapse when subjected to the wear and tear encountered in use and which may be readily provided with an effective head and closure.

Still another object is a drum having convex sides and rounded corners with a similarly shaped slip-over cover, both of which are similarly constructed from convolutely wound fibrous material with the cover effectively embracing the periphery of the open end of the container even when subjected to extreme conditions of use and abuse.

A further object is to provide an improved method for making fiber drums possessing the aforementioned superior characteristics.

Other objects and advantages will become apparent from the following description of my invention which is to be taken in conjunction with the accompanying drawings in which:

FIG. 1 is a perspective view illustrating drums fabricated in accordance with my invention and which will move to be helpful in better understanding the present invention as well as its many salient features;

FIG. 2 is a perspective view of an uncut shell of fibrous material which is neither convolutely or spirally wound layers suitably shaped by means of a winding mandrel;

FIG. 3 is a perspective view of the shell illustrated in FIG. 2 after it has been subjected to a suitable cutting operation to provide shells having reduced predetermined lengths;

FIG. 4 is a schematic sectional view of a cut shell on a support prior to the securement of a closure disc at one end thereof;

FIG. 5 is a perspective view illustrating the cut shell in its initial stage of deformation during the disc securement cycle;

FIG. 5A is an enlarged sectional view more clearly illustrating the corner crease production during this shell deformation;

FIG. 5B is similarly a sectional view illustrating the approximate configuration of the crease formed at each of the corners of the deformed shell of FIG. 5;

FIG. 6 illustrates the final deformation stage of the partially deformed shell of FIG. 5 to effect the desired surface-to-surface contact of this shell with the internally positioned disc;

FIG. 6A is a partial sectional view of the deformed shell of FIG. 6 more clearly illustrating the securement of this shell with its disc;

FIG. 7 is a perspective view illustrating the application of staples to more securely unite the disc with the deformed zones of the cut shell;

FIG. 8 is an exploded perspective view illustrating the members employed in completing the formation of the shell end closure;

FIG. 9 illustrates in section the disposition and securement of the members illustrated in the preceding view to effect the desired end closure;

FIG. 10 is an exploded perspective view of the finished shell together with a similarly wound liner prior to the insertion of the latter within the shell;

FIG. 11 is a perspective view of this liner properly mounted in the finished shell;

FIG. 12 is an exploded perspective view of the finished shell having an inner liner along with a telescopically slidable cover which is finished in a manner substantially similar to that of the shell and with the inclusion of a liner to be interposed and located in the juncture between the cover and shell liner;

FIG. 13 is a sectional view of the assembled components illustrated in FIG. 12;

FIG. 14 is a fragmentary sectional view of the base of a drum body which may have incorporated therein a suitable gasket to affect a superior seal between the liner and the bottom closure assembly of the outer shell;

FIG. 15 is a dual compartmental drum incorporating the teachings of my invention with certain parts broken away and sectioned and also with parts of the end closures removed for clarity;

Figure 16:
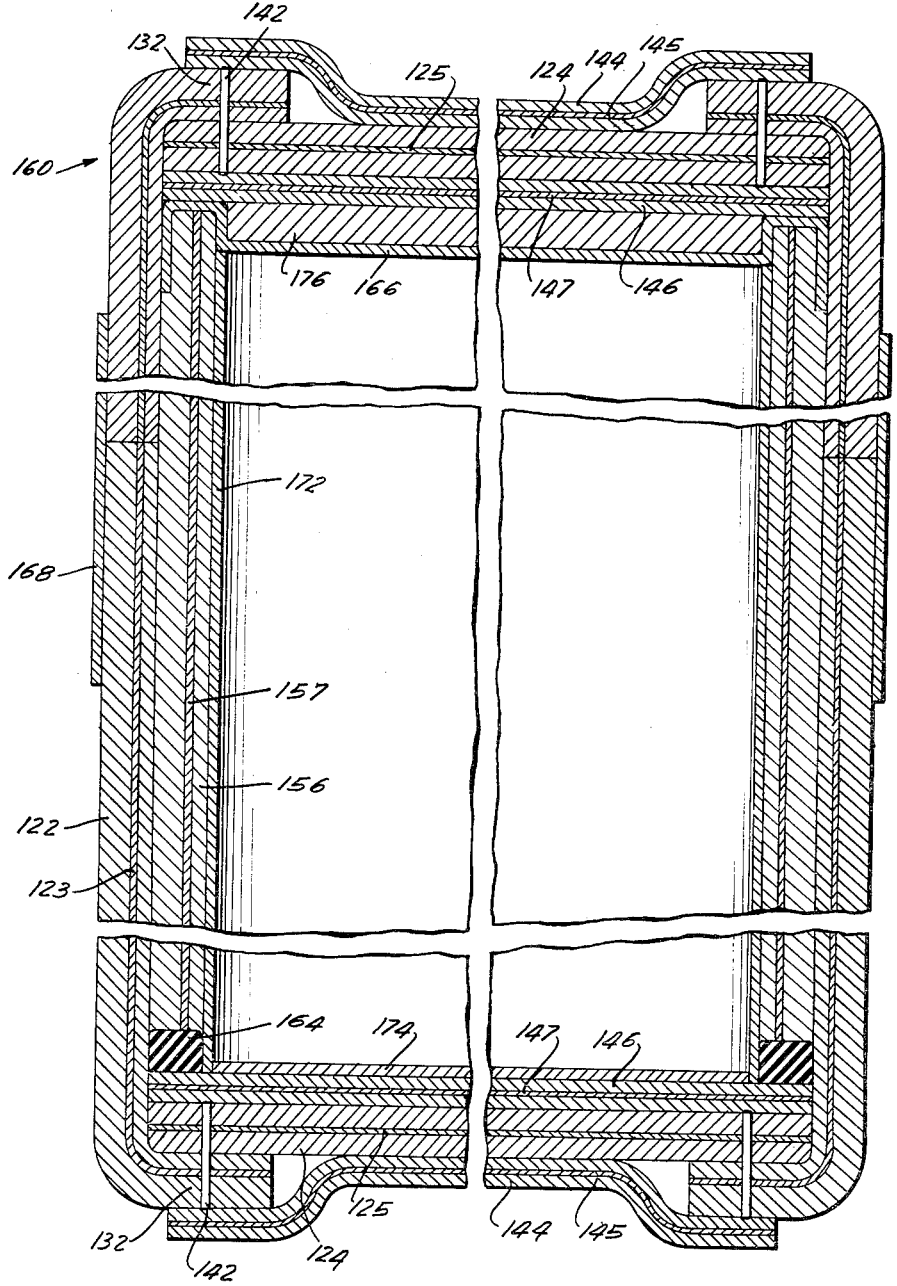
FIG. 16 is a longitudinal sectional view of a completely sealed drum having a plurality of liners and barriers and other applications for effecting a superior hermetically sealed condition for this drum with certain parts broken away and removed.

In carrying out my invention, I have found that a fiber drum which is efficient in its use of space, and at the same time is sturdy and strong, can be obtained by forming the body of the drum with a plurality of sides, preferably four, which are transversely convex and are connected together by rounded corners. Furthermore, a drum cover embodying the same principles and similar manufacturing techniques would naturally be desirable and function to supplement the superior drum characteristics as well as inherently reduce the cost of the entire drum construction.

A representative number of fiber drums embodying my invention are shown in FIG. 1 and will serve to illustrate the many features supplied by this invention to the fiber drum art. Thus, in this view a series of such drums, each having four arcuate sides and rounded corners connecting the sides, are arranged to render numerous of the aforementioned objects and advantages, among others, readily apparent. It should be understood at this time that drums having different numbers of sides may also be made by adopting the principles of my invention, and accordingly be efficiently stored in contiguous relationship and possess the optimum characteristics of the illustrated drums. Each of the sides of my drums are transversely convex so that the sides bow outwardly. By forming the sides in this manner, I eliminate the tendency of the sides, as on a rectangular fiber drum, to bow inwardly and thus collapse. This greatly increases the strength of the drum body or shell by attenuating and properly distributing applied forces and, in addition, assures a tighter fit and seal between the drum shell and its closure. Thus, pressure acting on the drum exterior is transmitted throughout the convex sides as well as corners. The directly affected parts will resist such pressures more effectively and, due to the stress distribution, will cause the remaining sides and corners to accept their share of the stress application and consequently deform by bowing outwardly thereby producing a much tighter and stronger seal of the drum closure. In the case of square or concave side walls, force applied to the corners or side walls will cause flexure of the side walls in an inward direction and consequently reduce the tightness and effectiveness of such container closure.

The degree of curvature of the convex side walls may be varied considerably. As the degree of curvature increases, their efficiency in the use of space decreases since greater waste space will be inevitable between the side walls of shells stored in contiguous relationship. On the other hand, the radius of curvature of the side walls should be selected so that they will be capable of adequately accepting the contemplated loads and pressures. In this connection, it may be desirable to increase the thickness of these side walls in an effort to maintain the radius of curvature at a maximum. I have found that as the size of the container increases optimum results are obtainable by merely thickening the side walls instead of decreasing their radius of curvature. Thus, the radius of curvature of the side walls of the contemplated sizes of drums will not differ appreciably, but their thickness will range between definite practical limits.

Additionally, I have found that the side walls should be integrally connected together by convexly rounded corners substantially as illustrated. By rounding the corners in this fashion, I have found that I can avoid damage or mutilation to the fibers as well as enhance the proper continuation and stress distribution of the contemplated force applications. Naturally, the curvature of the corners may likewise be varied considerably, depending on the size of the drum and the contemplated use and abuse.

The closures for my drums may be similarly shaped and constructed so that the convex arch drum structure will not only prevent inward collapsing of their side walls but will also facilitate provisions for a far more effective seal for their open top since any force against the corner of the shells tends to bow the side walls outwardly into tight engagement with these closures.

In the manufacture of drums embodying the teachings of my invention, I initially provide an elongated tube 20 which has incorporated throughout its cross-sectional configuration the aforementioned characteristics and principles of arched sides and corners, by winding successive layers of fibrous material such as kraft paper around a central core or mandrel (not shown). This mandrel presents the desired number of side supporting surfaces, each of which is transversely convex and connected by round corners. The curvature of the side supporting surfaces and the corner supporting surfaces may be varied considerably for obtaining the aforedescribed curvature of the side walls and corners of the fiber shell depending upon the particular conditions and requirements. In this connection, a web for a roll of kraft paper may be suitably fed and guided through a predetermined path and series of operations to the selected mandrel around which succcessive layers of the web are convolutely wound to produce a tubular wall of the desired thickness.

As is frequently the case, this convolutely wound tube 20 will be appreciably longer than the desired length of the shell employed in the formation of the drum side walls. Furthermore, as will become apparent from the following description, the convolutely wound tube 20 is considerably longer than the usual drum cover which is partially formed therefrom in a manner similar to the formation of the drum outer shell. Thus, the tube 20 is preferably subjected to a cutting cycle wherein tube slitters reduce tube 20 into a number of shells 22 of predetermined lengths.

A shell 22 is then subjected to an operation whereby a closure disc 24 is to be mounted at one of its open ends. The disc 24 preferably possesses a precut configuration in which its peripheral edges conform with the internal contours of the shell 22. For purposes of the description immediately following, it should be understood that I am in the process of manufacturing the body side walls of a drum which are to embody the teachings of my invention. With this in mind, a bottom closure disc 24 is positioned inwardly a preset distance $d$ from the bottom edge 25 selected for the shell 22 through the employment of suitable apparatus in a manner substantially as illustrated in FIG. 4. This apparatus may include a shell mount 26 for embracing the internal faces of the shell 22 so that when the latter is positioned thereon it will be prevented from undesirable shifting laterally during the securement of the disc 24 thereto. To facilitate the proper location of the disc 24 with respect to the bottom edge 25 of shell 22, a shell platform 28 projects from the shell mount 26 so that this bottom end 25 of the shell 22 will project a predetermined distance $d$ beyond the upper end 29 of the shell mount 26 equal to the sum of $d$ and the thickness of the disc 24. The disc 24, which may also be formed from kraft paper, is then placed upon this upper end 29 after a suitable application of adhesive 30 to outer peripheral portions of its upper face over a sector having a width substantially equal to $d$. The adhesive 30, for most practical applications, is preferably a waterproof resin adhesive of the type that will set upon an increase in temperature.

While the adhesive 30 is still in a wet state, portion 32 of the shell 22 of a length substantially equal to the distance $d$ above the outer face of the disc 24 is flanged inwardly to securely engage the corresponding surfaces of the disc 24 by means of the adhesive 30. To suitably provide shell 22 with this flange portion 32 the fold line 33 is conveniently formed. This is accomplished, with particular reference to FIGS. 5, 5A and 5B, by creasing the walls of shell 22 at a location $d$ from the edge 25 and simultaneously compensate for the necessary decrease in surface area by incorporating corner creases 34 in the flange portion 32 adjacent the rounded corners of the side walls. This particular folding and creasing may be accomplished by suitable die pressing apparatus 35 so that the flange portion 32 will be initially disposed at an acute angle with respect to the plane of the disc 24. Subsequent to this initial folding stage, a further die pressing application forces the internal faces of the flange portion 32 into engagement with the corresponding peripheral zones of disc 24. Thus, the flange portion 32 will form an inwardly normally extending flange anchored to the disc 24 by means of the adhesive 30 with the initially formed creases 34 cooperating to permit this portion 32 to assume the proper configuration during the final flange formation stage.

Since the adhesive 30 is of the temperature setting type, the final pressing stage is preferably accomplished by mold 36 which internally mounts a heating unit 38. This mold 36 may additionally include downwardly projecting and peripherally extending segments 40 for shaping the shell 22 along the fold line 33 and, additionally, for preventing the flanged portion 32 from being displaced outwardly during the final pressing stage. For most practical applications it has been found that the mold 36 should impart approximately 30 to 50 tons of force during the die closing cycle and supply about 350° F. temperature by means of the heating unit 38. In this connection, the die cavity of the mold 36 should remain closed for approximately 6 seconds to accomplish the desired securement of the flange portion 32 to the disc 24. Obviously, the temperature, pressure and cycle duration incident to this final molding application will vary depending upon the dimensions of the shell 32 and disc 24, their constituent materials and the selected adhesive 30.

In an effort to provide a more positive securement of the flanged portion 32 and disc 24, a series of staples 42 may be employed and suitably driven through these two parts by hand, suitable manual or automatic stapling devices. In this regard, a sufficient number of staples should be inserted at flange corners to adequately secure the corner creases 34 to disc 24. As will be evident to those skilled in the art, staples necessarily present apertures through which foreign matter may enter the interior of a drum. Accordingly, suitable structure is provided for covering the exposed staples 42 both interiorly and exteriorly. This structure will not only function to rigidify and strengthen the formed closure of shell 22 but will cooperate to provide an effective seal for this closed end of shell 22. Thus, in FIG. 8 components for such structure are illustrated, along with the partially completed drum shell, and include an outer layer 44 and inner layer 46 both of thinner gauge sheet material than disc 24. These layers 44 and 46 have transversely convex peripheral side edges and rounded corners thereby approximating the configuration of disc 24 in most respects.

As illustrated in FIG. 8, the lower face of layer 44 and upper face of layer 46 are suitably coated with a waterproof resin adhesive of the temperature setting type. The layers 44 and 46 are then positioned on the flanged portion 32 of shell 22 and inner face of disc 24, respectively. These parts are supported by means of a suitably shaped mandrel 48 which preferably includes, along its upper face, a resilient layer formed from suitable material such as foam rubber.

The layers 44 and 46 together with the flanged portion 32 and disc 24 are then subjected to a suitable heat and pressure application to securely unite these parts together while at the same time initiating the setting of the adhesive coating applied to layers 44 and 46. Accordingly, an upper die 50 may be reciprocal with respect to the mandrel 48 and interiorly mounts a heating element 52. The die face is preferably provided with a downwardly extending centrally located projection 54 for forcing the central sector of layer 44 into engagement with proximate surfaces of the disc 24. The remaining die faces, which include the circumferentially extending apron 55, facilitate the securement of the peripheral edges of this layer 44 to the flanged portions 32 as well as molding of edges of this layer substantially as shown. The resilient layer 49 will obviously prevent the staples 42 from being punched through the layers 44 and 46 upon the downward reciprocation of the die 50. In most of the contemplated fiber drum formations die 50 will exert approximately 500 pounds force and provides 300 to 350° F. temperature for approximately 12 to 14 seconds. In this connection, the pressure, temperature and duration of both will be dependent upon the particular requirements and conditions including the size of materials employed for the parts to be united as well as the type adhesive utilized.

The composite structure formed as a result of the die stamping partially illustrated in FIG. 9 can be employed as either a drum body outer shell or as a closure for such drum. In fabricating a drum closure I simply increase the size of the closure shell during the initial mandrel winding discussed in connection with the tubular body 20 illustrated in FIG. 2. This provision for a container closure will become apparent eventually from the following description.

The adhesive employed during the mandrel winding step for uniting the laminated layers of fibrous material in the drum body outer shell 22 is preferably still wet and in a moist state. When the tubular shell 22 is thus wet and moist, its cross-sectional dimensions will be inherently greater than those available in a totally dry shell or one possessing a moisture content equal to that present in the ambient atmosphere with its adhesive which is employed for uniting the fiber lamina in a cured condition. Therefore, while the outer shell 22 is in this wet condition, a super-dried liner 56 is inserted into the shell 22 to have one of its ends resting upon the inner face of the inner layer 46. This liner 56 is preferably a generally cylindrical tubular body made of laminated layers of fibrous material with each side thereof transversely convex and joined together by rounded corners. For all intents and purposes, this liner 56 will be longer than the effective length of the flanged outer shell 22 and will present outer cross-sectional dimensions slightly larger than the internal cross-sectional dimensions of the outer shell 22 when both are subjected and exposed to normal ambient conditions as is the case during ordinary drum use. Thus, the super-dried liner 56, which will naturally shrink in physical dimensions when in such condition will freely pass into the interior of the moist and consequently expanded outer shell 22. The liner 56 will then absorb moisture from both the outer shell 22 and the ambient to thereby expand into tight face-to-face contact with this shell 22 which, at the same time, will be subjected to shrinking as a result of the dissipation of its moisture content and equalization thereof with that of the liner 56 and ambient. Under the circumstances, the shell 22 and liner 56, respectively, will be under tension and compression.

In the process of overdrying, for the purposes of shrinking the inner liner 56, one or more of these liners may be passed through conveyor-type ovens. Ovens employed in practicing the present invention are approximately 60 feet long and have air, at elevated temperatures, circulating therethrough at relatively high velocity. The conveyor-mounted inner liners are usually subjected to the environment created by these ovens for approximately 20 minutes in order to attain the desired liner shrinkage.

If desired, the inserted end of the shrunk liner may be forced into firm engagement with the inner face of the inner layer 46 by means of a suitable press. Furthermore, to insure more positive engagement of the outer surfaces of the liner 56 and inner surfaces of the shell 22, the inner faces of the rounded corners of the transversely convex sides of the outer shell 22 may be coated with a suitable adhesive 58. In any event, the finally assembled outer shell 22 with an internally secured mounted liner 56 will approximate the structure illustrated in FIG. 11.

As stated in the foregoing and as illustrated in FIGS. 12 and 13, a drum closure 60 is formed in substantially the same manner as the container outer shell 22. Accordingly, both will possess an inwardly extending flange portion 32 which is secured to a disc 24 by means of an interposed adhesive 30 as well as a series of staples 42. The outer layer 44 and inner layer 46 of relatively reduced gauge are then adhesively secured to the disc 24 with the peripheral side edges of the outer layer 44 embracing the outer surfaces of the flange portion 32 substantially as illustrated in FIG. 13. The container closure 60 obviously has internal dimensioning equal to or slightly greater than the outer dimensioning of the liner 56 under normal ambient conditions in order that it may be telescopically positioned and displaced on this liner 56. As illustrated in section in FIG. 13, the bottom edges of the closure 60 will rest upon or be in close proximity to the upper edges of the outer shell 22 with the upper peripheral edges of the liner 56 adjacent the internal faces of the inner liner 46 of closure 60.

After the container outer shell 22 has dried sufficiently, the bottom closure thereof is dipped in molten wax or suitable resin, depending upon the contemplated use of the container. The coating thus provided by this dipping application insures a hermetically sealed bottom closure assembly for the outer shell 22 and consequently the drum body. In this connection, and as illustrated in FIG. 14, it may be found to be desirable to employ a gasket 64 between the bottom edges of the liner 56 and inner faces of the inner layer 46. As an alternative, a layer of wax may be provided on inner layer 46 so that the bottom edges of the liner 56 are embedded or nested thereby. Thus further means are provided for preventing any possible contamination of the selected contents for the drum body.

It will be observed in FIGS. 12 and 13 that means in the form of a layer of sheet material 66 may be utilized to guarantee a substantially hermetic seal between the closure 60 and the drum body. In this connection, a strip of tape 68 may be employed to seal the juncture between cover 60 and the drum body.

In FIG. 15 I illustrate a multi-compartmental drum which incorporates the teachings of my invention. There it will be observed that I provide a drum particularly suitable for shipping certain chemicals which are preferably separated during shipping and mixed at some later time. Thus, a drum outer shell 22' having transversely convex sides which are connected together by rounded corners is initially provided as in the foregoing and will be in a substantially wet condition as a result of the state of the adhesive employed in securing together the convolutely wound lamina of fibrous material. A super-dried shell lining 56' of predetermined length is then inserted into shell 22' and is separated from a similarly positioned reduced liner 56" by a separating disc 70. This dual-compartmental lined shell may be appropriately glued to the internally mounted liners. Subsequently, this composite structure is subjected to either normal ambient atmospheric conditions or the mentioned oven so that the drum shell 22' will shrink into firm surface-to-surface contact with the liners 56' and 56". A pair of slip-over covers 60' and 60" which are fabricated in substantially the same manner as the aforedescribed cover 60 are then telescopically slipped over the open ends communicating with each of the drum compartments. Obviously after each compartment is filled with the desired chemical constituents of a particular formula, the appropriate cover is telescoped upon the exposed sector of the associated drum liner. Then, with these slip-over covers properly mounted, I seal the drum separately at both ends with an appropriate tape similar to that illustrated in FIG. 13.

Referring now to FIG. 16 wherein I illustrate a drum manufactured by following the teachings of my present invention for the purpose of carrying particularly sensitive products, this form of drum is remarkably effective and superior in the carrying of sensitive products either for long storage or through conditions of atmospheric changes of humidity and temperature. I incorporate barriers and shields in my drum construction to thus provide a highly insulated drum which protects the contained product from any rapid temperature changes in the product area and thereby minimize and, in most instances, prevent internal pressure changes resulting from extensive temperature changes in the ambient. Furthermore, as a result of these properly located layers of barrier and shielding material, I minimize breathing of the drum as a consequence of minor changes in ambient temperature. These combinations of highly protective characteristics in the various components of the drum, in addition to the superior insulative properties of the heads and walls of the drum, tend to preserve the dryness or moisture content of materials in the product areas of the drum to an unusual extent. Where delicate products are packed in my drums, with a small amount of rust inhibitors, my drums not only offer an unusual amount of product protection but freedom from any sweating or extensive changes in moisture content that might otherwise result.

Thus, in FIG. 16 I illustrate a drum providing such superior characteristics. The drum outside shell 122 is initially formed, upon a suitable mandrel, with a barrier 123 of one convolution of an asphaltic compostion, Mylar or other suitable barrier material. This shell 122 is then subjected to the various steps employed in forming the drum bottom closure as previously disclosed. In this connection, a barrier 125 of suitable material such as an asphaltic composition, mylar or the like is initially incorporated into the closure disc 124. Obviously, when staples are inserted through flange 132 into disc 124, apertures are necessarily formed which may provide an access into the drum interior and thereby cause contamination of its contained product. Accordingly, in the cover sheets or layers 144 and 146, respectively, I incorporate barriers 145 and 147 of suitable materials. These particular barriers function to minimize any detrimental effects incident to the employment of staples 142. The slipover cover 160 will include similar barriers and, accordingly, the various parts thereof will be designated with identical numerals. The drum liner 156 also has a barrier 157 incorporated therein during the initial winding thereof and is located proximate to the inner walls of the liner. As previously described, a gasket 164 may be employed between the bottom edge of liner 156 and upper peripheral sectors of layer 146. The inner walls of liner 156 may be lined with a barrier 172 of an asphaltic composition, Mylar or the like. Similarly, a barrier layer 174 may be positioned on the upper face of layer 146 and have its peripheral edges disposed adjacent the bottom edges of barrier 172. A barrier sheet 166 is additionally provided and is formed from suitable barrier material. To provide a more effective seal between the cover 160 and the drum body, I supplement the cover 160 with a further disc 176. This disc 176 cooperates with the drum liner 156 to provide additional deformation of the barrier sheet 166 when the cover 160 is slipped over liner 156. A barrier type of pressure sensitive tape 168, as previously disclosed, cooperates to complete the seal between the cover 160 and the drum. Naturally, if desired, the bottom of the drum of this embodiment may be dipped in wax in a manner substantially similar to that previously described so that the bottom of this drum is sealed to its fullest extent. It should be clear that one or more of the barriers disclosed in connection with the drum of this particular embodiment may be eliminated or modified, depending upon the particular conditions and requirements.

Certain applications of the above-described drum, having a lined outer shell with telescopically slidable closure, will necessitate the employment of properly located barriers and shields to more positively prevent drum content contamination under extremely severe conditions of use and abuse in the outer shell 22 or liner 56 and apron of closure 60 as well as in the disc 24 of the outer shell 22 and closure 60. This barrier or shield may be interposed within the tubular body walls when these bodies are initially wound upon the mandrel mentioned in the discussion of FIG. 2. Additionally, this barrier or shield may be of an asphaltic composition or foil such as aluminum, Mylar or other suitable material.

I have found that similar superior results are attainable by fabricating one or more parts of any of the aforedescribed drums from a resinous material such as the commercially available polyesters suitable for such purposes which may additionally include suitable reinforcing such as fiber glass filaments or strands in a manner conventionally employed. In this connection, the drum liner may be formed from such material in order that a major portion of the drum inner walls will incorporate the desirable characteristics of the material selected, as for example inertness and non-toxicity. The formation of this liner may be accomplished in accordance with the aforedescribed construction of this part or the resortment to one of the many conventional processes for fabricating products from such materials.

Thus, the numerous aforementioned objects and advantages, among others, are most effectively attained. Accordingly, it is intended that my invention be defined by the appended claims which are to be accorded their fullest scope and not be limited in any respect by the aforegoing description of my invention of several practical embodiments thereof.

I claim:

1. An improved fiber drum comprising a shrunken tubular shell having a plurality of sides and made of wound laminated layers of fibrous material, each side of said shell being transversely convex, and the corners joining said sides together being rounded, a fixed rigid closure disc secured to one end of said shell, a tubular liner within said shell having a plurality of sides and made of wound laminated layers of fibrous material, each side of said liner being transversely convex, and the corners joining the sides of said liner together being rounded, said liner being longer than said shell, said liner being embraced by said shell in substantially tight surface-to-surface contact, with said shell being under tension and said liner being under compression, wherein a rigid container is formed whereby said liner and said shell resist loads as an integral one-piece unit, the moisture content of said liner and shell being substantially equalized, a removable closure at the other end of said shell being similar in construction as said shell and having a rigid closure disc similar to the above mentioned disc and a tubular apron having a sliding telescopic fit with the exterior surface of said liner, said apron having a plurality of sides and made of wound laminated layers of fibrous material, each side of said apron being transversely convex and the corners joining the sides of said apron together being rounded, the radius of curvature of said corners being substantially less than said sides, the outer cross-sectional dimensions of said liner being less than the inner cross-sectional dimensions of said apron, and said apron and said liner being so constructed and arranged such that forces applied transversely to said drum cause the liner to expand into tight engagement with the apron of the removable closure.

2. The invention in accordance with claim 1, wherein a bonding agent is interposed between said liner and said shell to fixedly secure one with respect to the other.

References Cited in the file of this patent

UNITED STATES PATENTS

| | | |
|---|---|---|
| 656,700 | Pullen | Aug. 28, 1900 |
| 1,923,426 | Eggerss | Aug. 22, 1933 |
| 1,992,182 | Buist | Feb. 26, 1935 |
| 2,027,231 | Hutt | Jan. 7, 1936 |
| 2,267,746 | Pelosi | Dec. 30, 1941 |
| 2,275,449 | Magill | Mar. 10, 1942 |
| 2,311,291 | Carlson | Feb. 16, 1943 |
| 2,546,137 | Schmidt | Mar. 20, 1951 |
| 2,623,681 | Wilcox | Dec. 30, 1952 |
| 2,665,047 | Belsinger | Jan. 5, 1954 |
| 2,727,673 | Bergstrom | Dec. 20, 1955 |
| 2,801,577 | Ingham | Aug. 6, 1957 |
| 2,845,210 | Fischer | July 29, 1958 |